US012587000B2

(12) United States Patent
Small

(10) Patent No.: US 12,587,000 B2
(45) Date of Patent: Mar. 24, 2026

(54) TRUNK CABLE INSTALLATION VERIFICATION TOOL

(71) Applicant: The United States of America, as represented by the Secretary of the Navy, Crane, IN (US)

(72) Inventor: Scott L. Small, Newberry, IN (US)

( * ) Notice: Subject to any disclaimer, the term of this patent is extended or adjusted under 35 U.S.C. 154(b) by 882 days.

(21) Appl. No.: 17/865,759

(22) Filed: Jul. 15, 2022

(65) Prior Publication Data

US 2023/0012557 A1      Jan. 19, 2023

Related U.S. Application Data

(60) Provisional application No. 63/222,231, filed on Jul. 15, 2021.

(51) Int. Cl.
H02G 3/22 (2006.01)
H02G 1/06 (2006.01)

(52) U.S. Cl.
CPC ................. H02G 3/22 (2013.01); H02G 1/06 (2013.01); *H02G 2200/30* (2013.01)

(58) Field of Classification Search
CPC ........ H02G 3/22; H02G 1/06; H02G 2200/30; H02G 1/00
See application file for complete search history.

(56) References Cited

U.S. PATENT DOCUMENTS

| | | | | | |
|---|---|---|---|---|---|
| 4,338,725 A | * | 7/1982 | Martin | ................... | B25H 7/005 |
| | | | | | 33/529 |
| 4,394,799 A | * | 7/1983 | Moree | ..................... | G01C 9/28 |
| | | | | | 33/351 |
| 7,536,798 B2 | * | 5/2009 | Silberberg | ............... | G01C 9/34 |
| | | | | | 33/379 |
| 9,151,606 B2 | * | 10/2015 | Silberberg | ............... | G01C 9/28 |
| 10,969,213 B1 | * | 4/2021 | Silberberg | ............... | G01C 9/34 |
| 10,976,159 B1 | * | 4/2021 | Silberberg | ............... | G01C 9/28 |
| 11,137,239 B2 | * | 10/2021 | Riopel | ................... | G01B 5/245 |
| 2012/0151785 A1 | * | 6/2012 | Lettkeman | ............... | G01C 9/34 |
| | | | | | 33/301 |
| 2016/0025490 A1 | * | 1/2016 | Hoppe | ..................... | G01C 9/34 |
| | | | | | 33/381 |
| 2023/0012557 A1 | * | 1/2023 | Small | ........................ | H02G 3/22 |
| 2025/0164244 A1 | * | 5/2025 | Brown | ..................... | G01C 9/34 |

FOREIGN PATENT DOCUMENTS

GB            2609891 A  *  2/2023  ............... G01C 9/24

* cited by examiner

*Primary Examiner* — Yaritza Guadalupe-McCall
(74) *Attorney, Agent, or Firm* — Christopher Feigenbutz; Naval Surface Warfare Center, Crane Division

(57) ABSTRACT

Provided is a trunk cable installation verification tool. The device comprises a body that attaches to a stuffing or fitting tube, a level tube, a magnet, and a tolerance indicator for aligning a cable. The body is shaped to fit the contours of the fitting tube for ease of attachment thereto. A magnet secures the body to the fitting tube for quick and non-permanent attachment. The tolerance indicator is preferably a V-shaped protrusion or a notch that is aligned with the centreline of the fitting tube and is used to ensure proper alignment of the cable, which is confirmed with a cable identification line. The verification tool ensures proper cable alignment and reduces/prevents stress on the bond line between cable outer jacket and the epoxy, thereby preventing premature cable failure and extending the maintenance intervals required to replace damaged cables.

10 Claims, 10 Drawing Sheets

TRUNK CABLE INSTALLATION VERIFICATION TOOL

CROSS-REFERENCE TO RELATED APPLICATIONS

The present application claims priority to U.S. Provisional Patent Application Ser. No. 63/222,231, filed Jul. 15, 2021, entitled "TRUNK CABLE INSTALLATION VERIFICATION TOOL," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200566US01) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to installation tools. More particularly, it pertains to a trunk cable installation verification tool.

BACKGROUND

Trunk cable assemblies are in constant need of installation, updating, modification, and repair. In maritime applications, this work is often performed while the ships are docked at a shipyard. In many ships, large cables are used to connect equipment to a rotunda fitting tube receptacles on the inside and the outside of the rotunda. These cables are 75-85 feet long and weigh approximately 100 lbs making them difficult to move and place. The fitting tube receptacles are welded onto the fitting tubes prior to the trunk cable assembly installation into the fitting tubes. If the cable is not installed correctly by having the cable identification line at 6:00 position inside the rotunda after the cable is secured outside the rotunda in the fitting tube receptacle, the stress on the bond line between cable outer jacket and the epoxy can cause anything multiple issues from electronic component failure to complete electrical power. The effort it takes to move one of these cables requires a crew of 8-10 workers to lift, insert, route, turn, twist, and place the cable is extensive. If the trunk cables can be routed correctly and secured properly it will maintain accurate performance of the cable, reduce rework alignment labor, and decrease cost. Current methods for aligning cables includes eyeballing them for quality/alignment without a definite method or tool. As such, it is evident that a more precise means for cable alignment is required.

SUMMARY OF THE INVENTION

The present invention relates to a trunk cable installation verification tool. The device comprises a body that attaches to a stuffing or fitting tube, a level tube, a magnet, and a tolerance indicator for aligning a cable. The body is shaped to fit the contours of the fitting tube for ease of attachment thereto. A magnet secures the body to the fitting tube for quick and non-permanent attachment. The tolerance indicator a V-shaped protrusion or a notch is aligned with the centreline of the fitting tube and is used to ensure proper alignment of the cable, which is confirmed by an identification line on the cable. The verification tool ensures proper cable alignment, which reduces/prevents stress on the bond line between cable outer jacket and the epoxy and thereby prevents premature cable failure and extends the maintenance intervals required to replace damaged cables.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is a trunk cable installation verification tool comprising: a body that attaches to a threaded fitting tube; a level tube; a magnet; and a tolerance indicator for aligning a cable. In an illustrated embodiment, the body comprises a first curved upper portion that fits the contours of the fitting tube and a second curved lower portion that fits contours of the fitting tube threads. In an illustrated embodiment, the magnet secures the body to the fitting tube. In an illustrated embodiment, the tolerance indicator extends from the second curved lower portion and further comprises an indicator that aligns with the fitting tube at a centerline. In an illustrated embodiment, the fitting tube centerline comprises an identification line at 6:00 position. In an illustrated embodiment, the tolerance indicator comprises a tolerance window for verifying and validating said fitting tube centerline.

In an illustrative embodiment, also provided is a trunk cable installation verification system comprising a trunk cable installation verification tool; a fitting tube comprising a centerline; and a cable comprising a cable centerline. In an illustrative embodiment, the trunk cable installation verification tool comprises a body that attaches to the fitting tube, a level tube, a magnet, and a tolerance indicator. In an illustrative embodiment, the magnet secures the body to the fitting tube, and the tolerance indicator aligns with the fitting tube centreline. In an illustrative embodiment, the cable is properly installed when the cable centerline is aligned with the fitting tube centreline as verified by the tolerance indicator.

Figure 1:
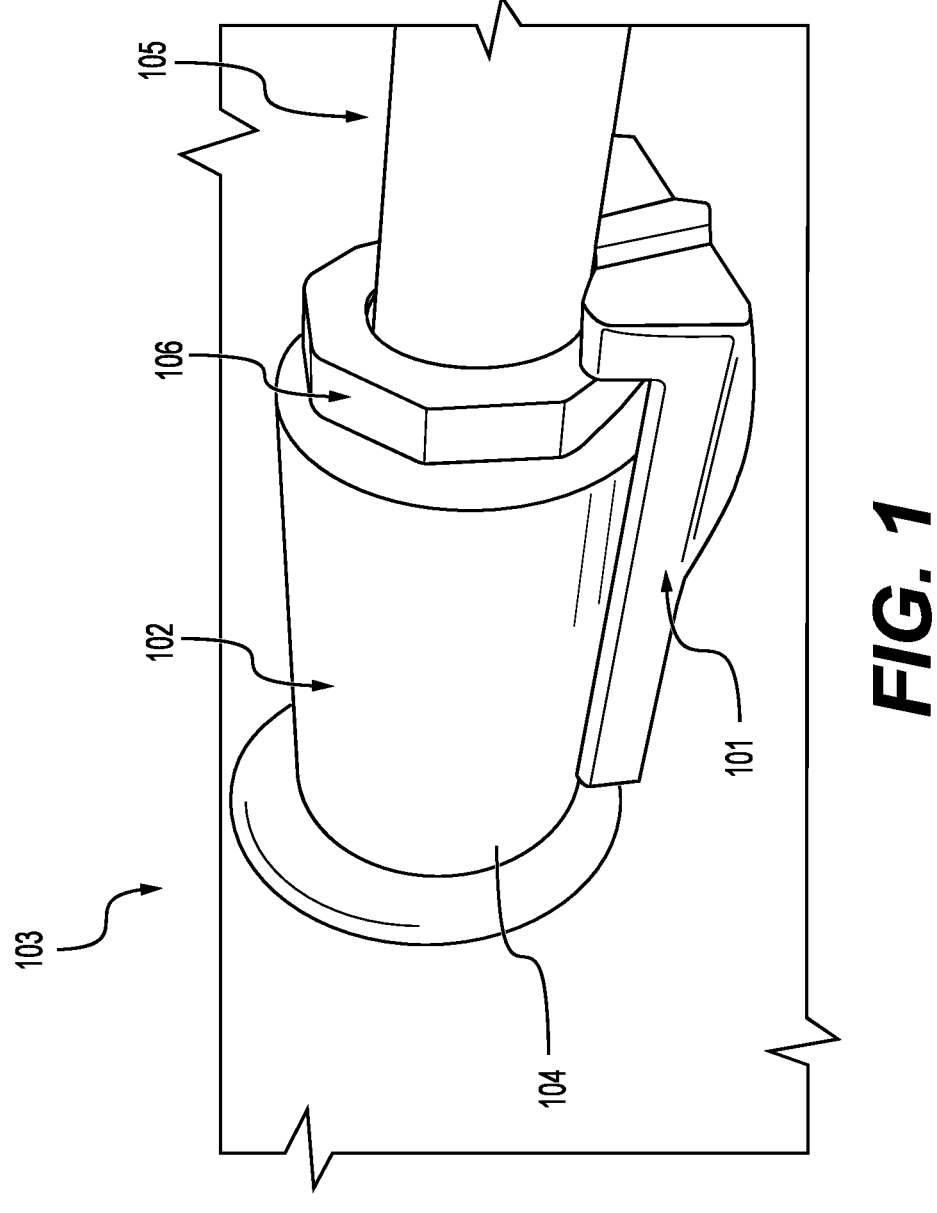
FIG. 1 shows a perspective view of the trunk cable installation verification tool attached to a fitting tube on a rotunda wall.
Figure 2:
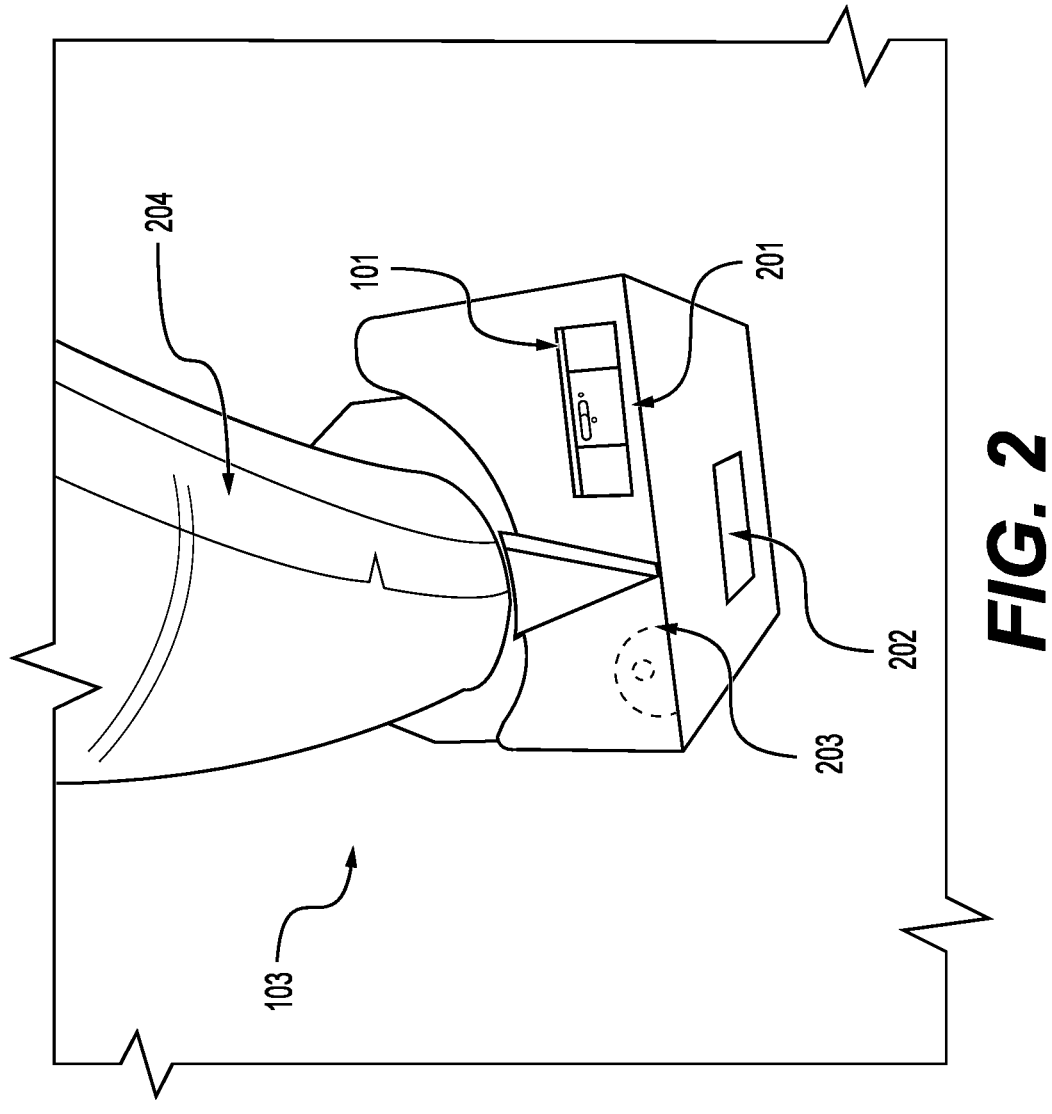
FIG. 2 shows a view of the trunk cable installation verification tool attached to a fitting tube on a rotunda wall.

FIGS. 1 and 2 show views of the trunk cable installation verification tool 101 attached to a fitting tube 102 on a rotunda wall 103. In an illustrative embodiment, the trunk cable installation verification tool 101 includes a body 104 that attaches to a stuffing or fitting tube 102 that can optionally include threading 106, a level tube 201, a magnet 202, and a tolerance indicator 203 for aligning a cable 105. The body 104 is shaped to fit the contours of the fitting tube 102 for ease of attachment thereto. The magnet 202 secures the body 104 to the fitting tube 102, which is made of steel for quick and non-permanent attachment. In an illustrative embodiment, the tolerance indicator 203 includes a V-shaped protrusion that is aligned with the centreline of the fitting tube 102, and is used to ensure proper alignment of the cable 105, which will be discussed in greater detail below.

Figure 3:
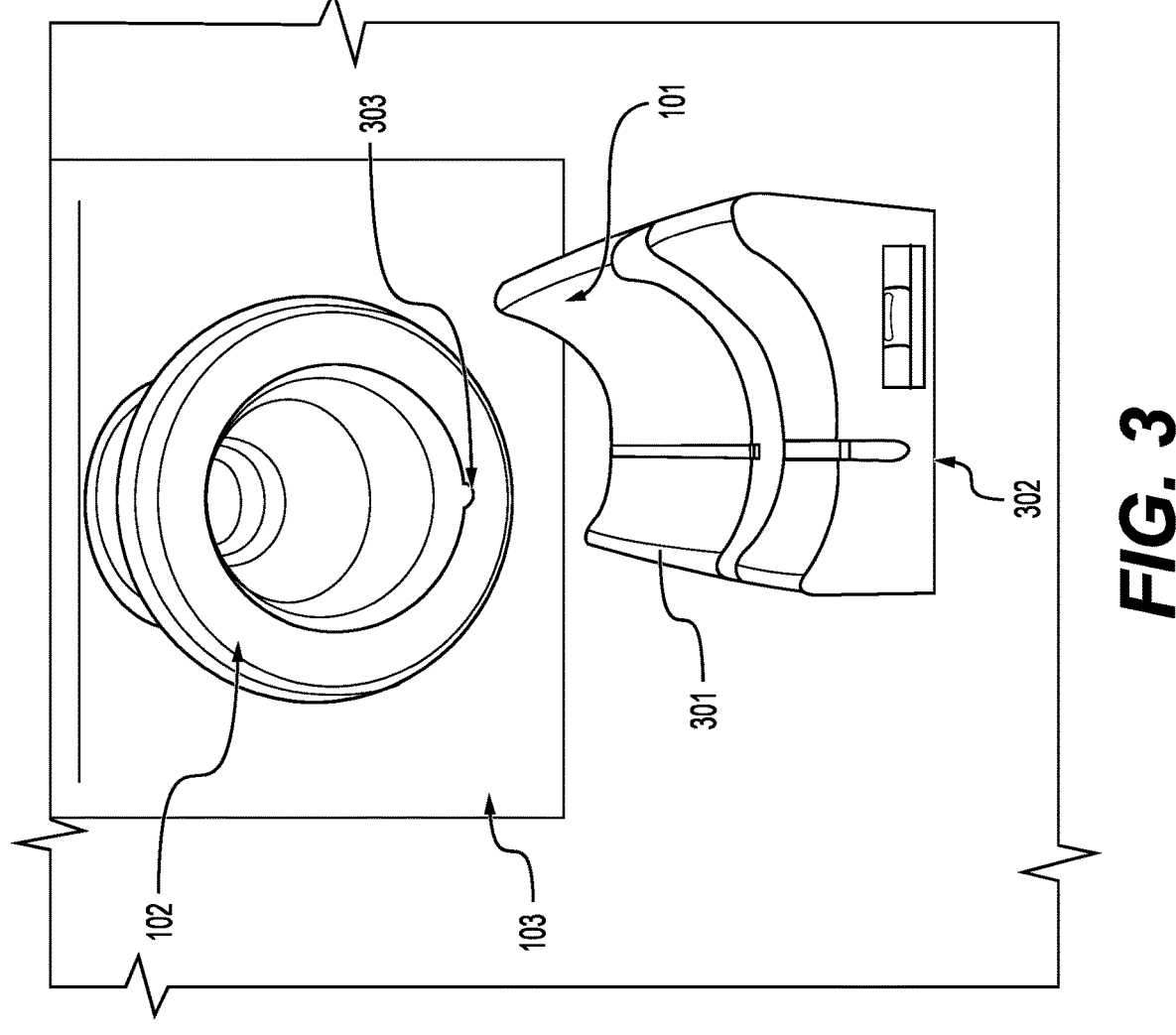
FIG. 3 shows a view of the trunk cable installation verification tool and a fitting tube.

FIG. 3 shows a view of the trunk cable installation verification tool 101 and a fitting tube 102. In an illustrative embodiment, the body 104 includes a curve 301 that corresponds to the curve of the tube 102. In an alternate embodiment, the tolerance indicator includes a tolerance window 302 for verifying and validating the cable centerline 204 on the cable 105 is positioned at 6:00 after installation. In an illustrative embodiment, the 6:00 position is marked at the centreline 302 of the fitting tube 102 when it is originally installed in the rotunda wall 103.

Figure 4A:
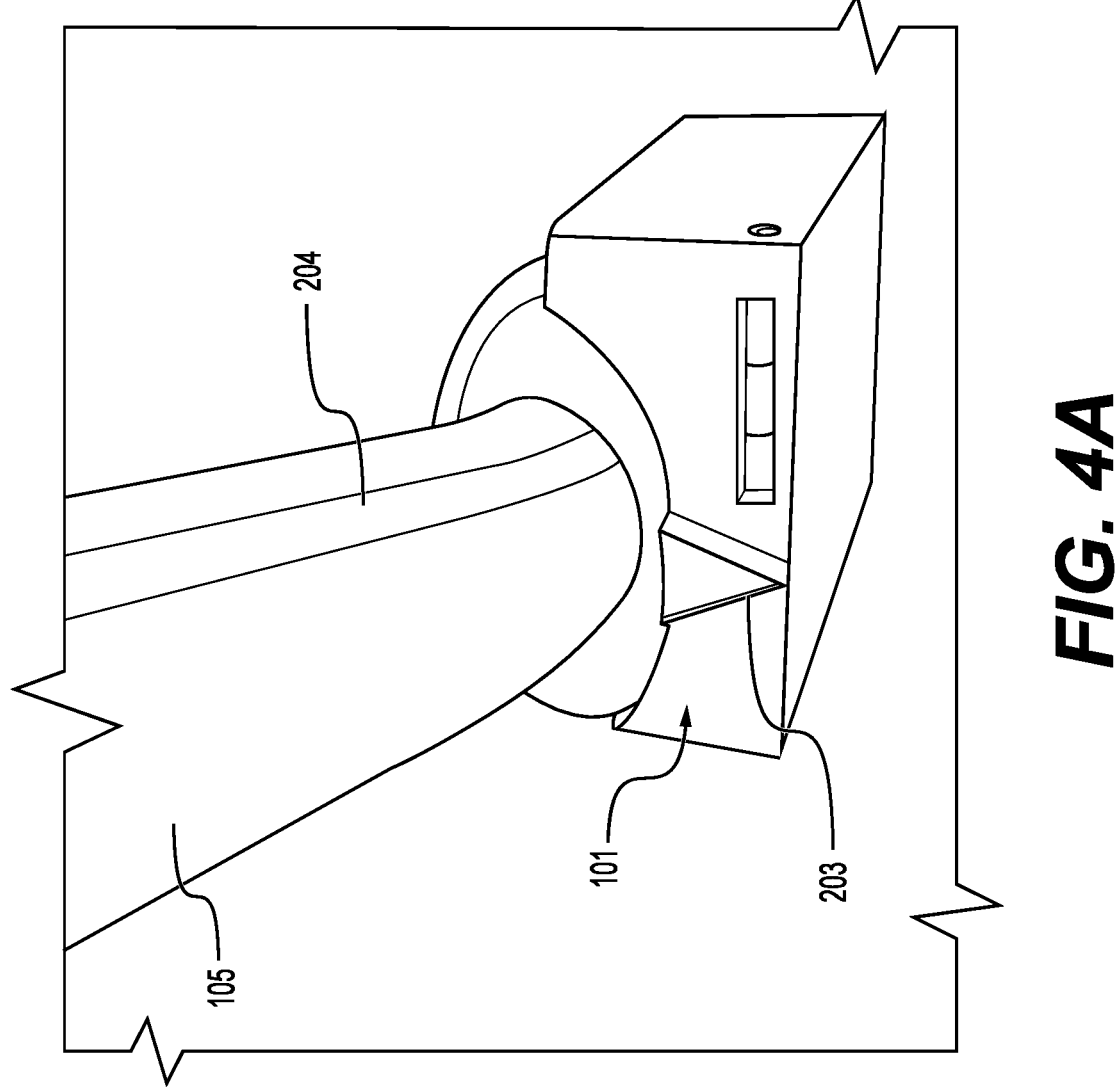
FIG. 4A shows a view of the trunk cable installation verification tool with a cable that is improperly installed.
Figure 4B:
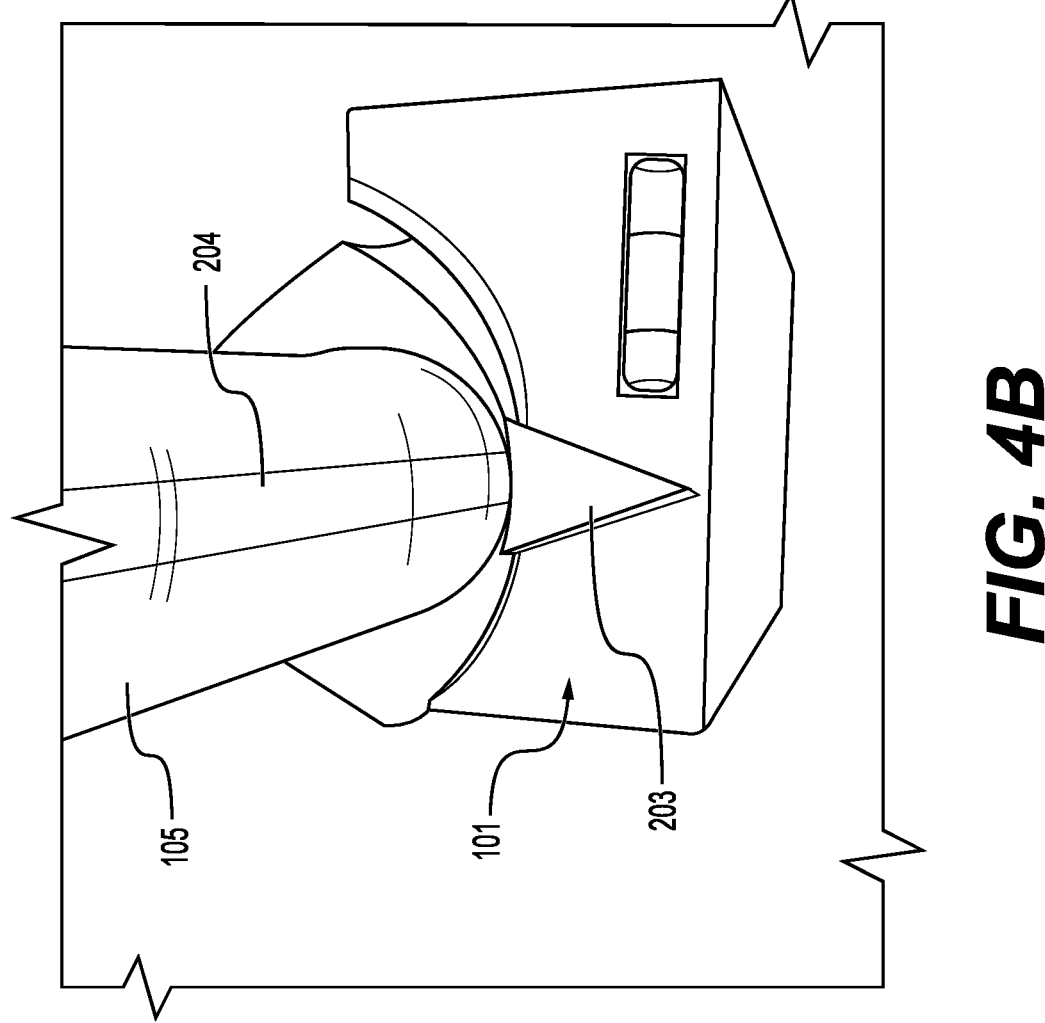
FIG. 4B shows a view of the trunk cable installation verification tool with a cable that is properly installed.

FIG. 4A shows a view of the trunk cable installation verification tool 101 with a cable 105 that is improperly installed, and FIG. 4B shows a view of the trunk cable installation verification tool 101 with a cable 105 that is properly installed. The tolerance indicator 203 provides a reference to ensure that the cable centerline 204 is properly aligned/installed. In an illustrative embodiment, the cable centerline 204 is aligned within the tolerance indicator 203 (as shown in FIG. 4A, a V-shaped protrusion). As is evident, the cable centerline 204 in FIG. 4A is not aligned within the tolerance indicator 203, and is therefore improperly installed. As can be appreciated, if the cable 105 is not aligned within the tolerance indicator 203, the stress on the bond line between cable outer jacket and the epoxy can cause multiple issues, such as component failure or complete electrical power loss. The effort it takes to move one of these cables 105 requires a crew of 8-10 workers to lift, insert, route, turn, twist, and place the cable 105 is extensive. When the cable 105 is properly installed, as shown in FIG. 4B, the cable centerline 204 is aligned within the tolerance indicator 203. As can be appreciated, proper alignment reduces/prevents stress on the bond line between cable outer jacket and the epoxy, thereby preventing premature cable failure 105 and extending the maintenance intervals required to replace damaged cables 105.

Figure 5A:
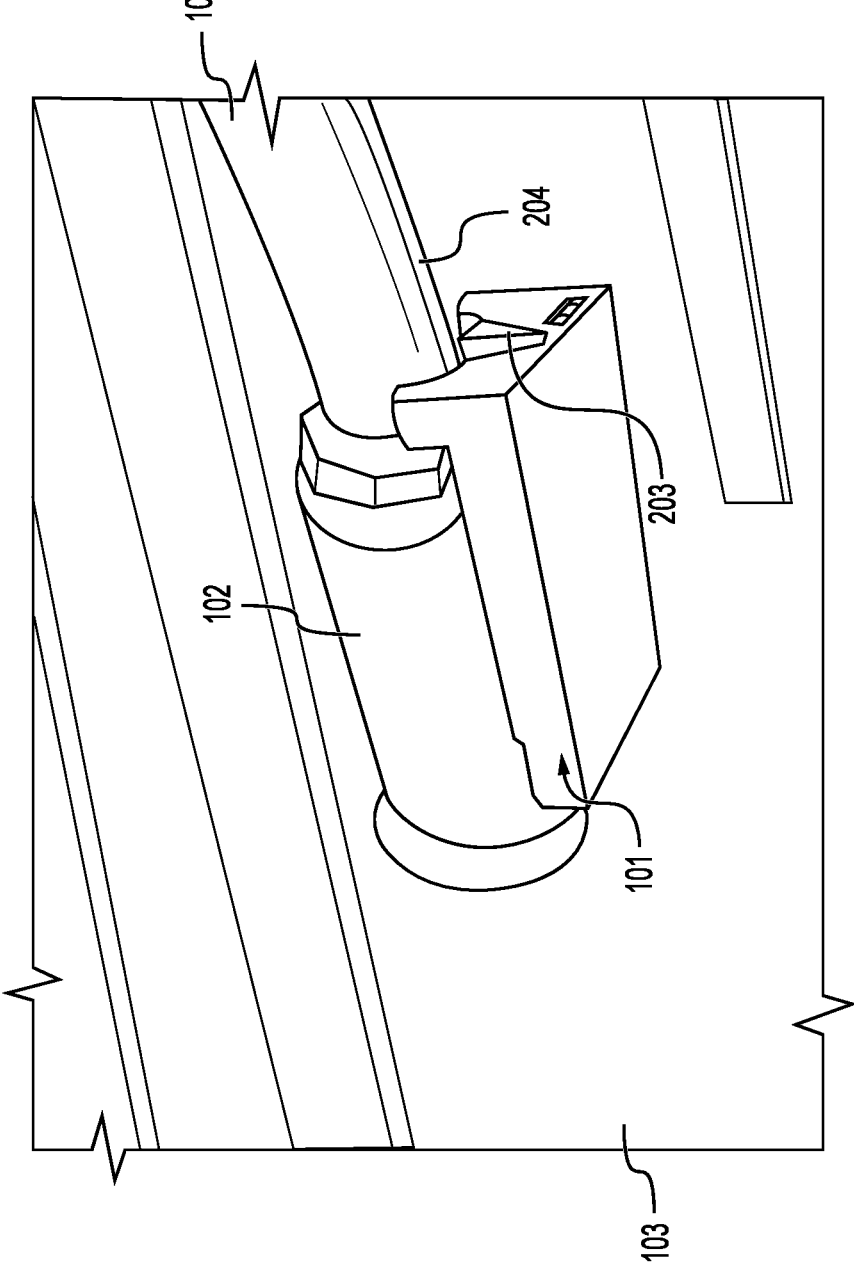
FIG. 5A shows a perspective view of the trunk cable installation verification tool attached to a fitting tube on a rotunda wall.
Figure 5B:
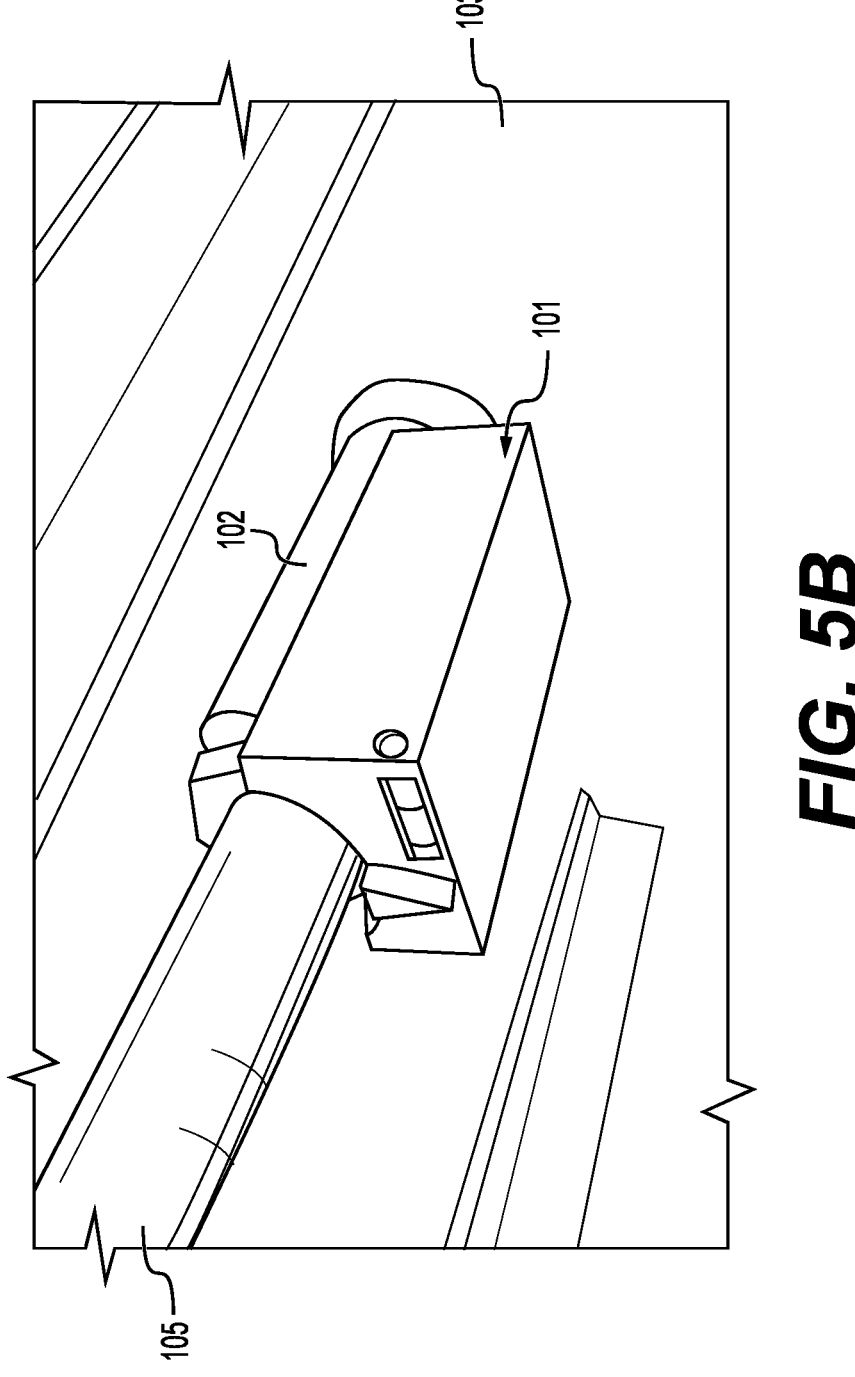
FIG. 5B shows a perspective view of the trunk cable installation verification tool attached to a fitting tube on a rotunda wall.

FIGS. 5A-B show perspective views of the trunk cable installation verification tool 101 attached to a fitting tube 102 on a rotunda wall 103. Previous methods for quality/alignment of cables 105 utilized visual estimation without a tool. As can be appreciated, without a level reference indicator, it is impossible to determine if the cable 105 is properly installed. Use of the trunk cable installation verification tool 101 ensures proper alignment and provides a reference that can be checked to ensure proper fitment. In a non-limiting example, a ship comes into dock and is leveled. One or more fitting tubes 102 are welded in the correct position on a rotunda wall 103 using. The cable 105 is installed correctly using the trunk cable installation verification tool 101, which in turn will be level, and after being leveled the cable centerline 204 is verified to be in the correct position within the tolerance indicator 203 once the cable is installed.

Figure 6:
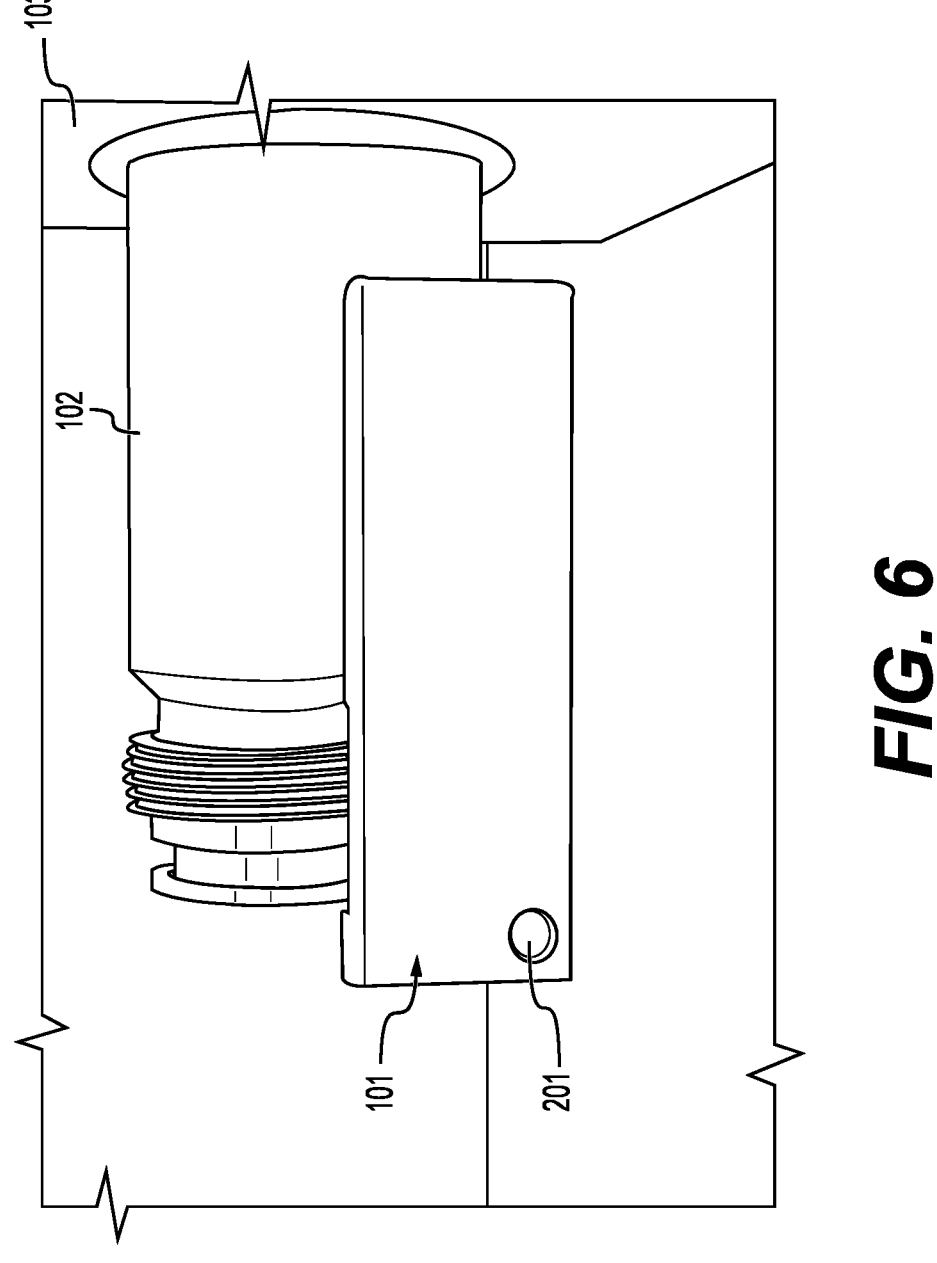
FIG. 6 shows a side view of the trunk cable installation verification tool attached to a fitting tube on a rotunda wall.
Figure 7:
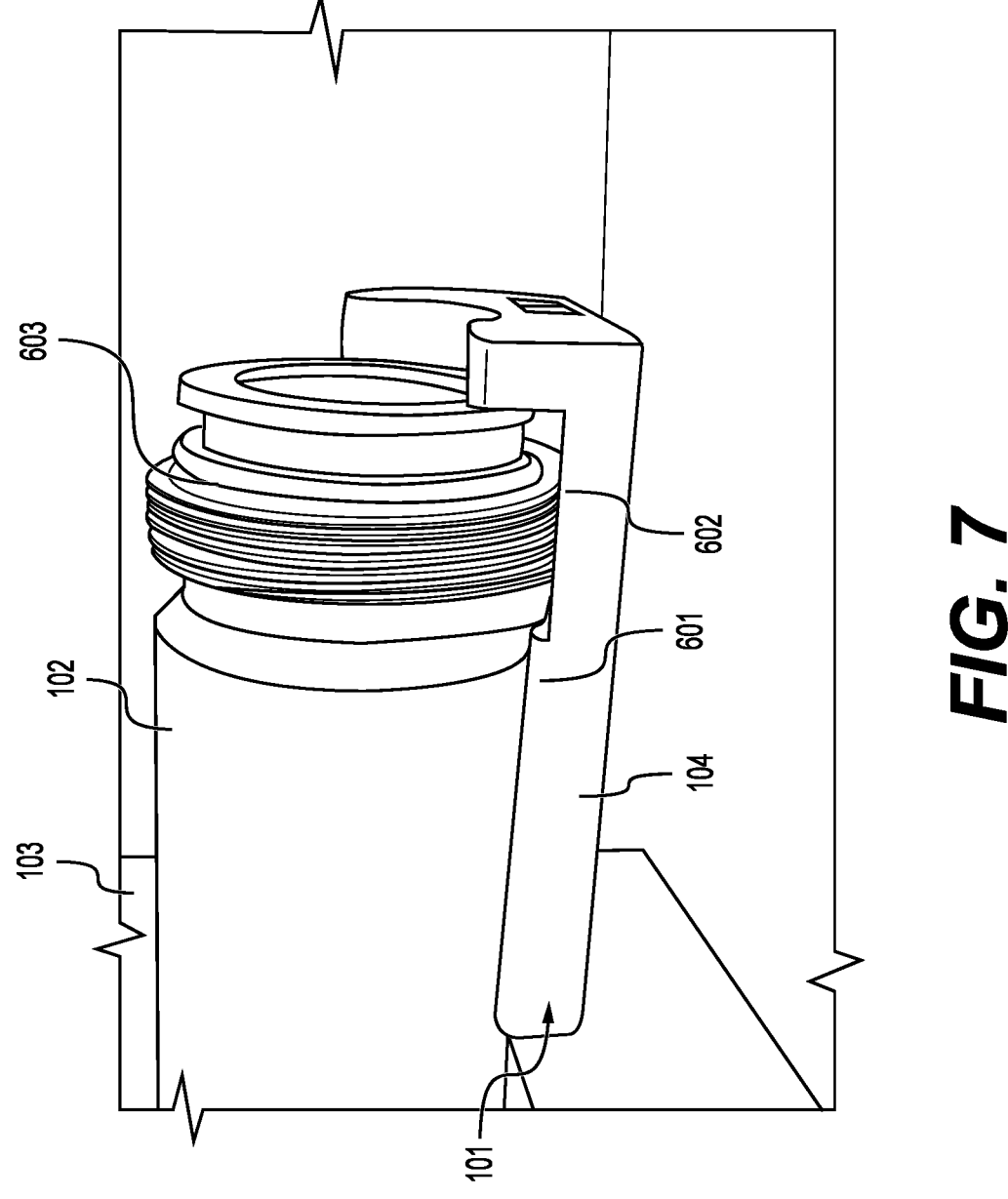
FIG. 7 shows a perspective close-up view of the trunk cable installation verification tool attached to a fitting tube on a rotunda wall.

FIGS. 6-7 show various views of the trunk cable installation verification tool 101 attached to a fitting tube 102 on a rotunda wall 103. The trunk cable installation verification tool 101 comprises a body 104 that attaches to a threaded fitting tube 102. In an illustrated embodiment, the body 104 comprises a first curved upper portion 601 that fits the contours of the fitting tube 102 and a second curved lower portion 602 that fits contours of the fitting tube threads 603. In an illustrated embodiment, the magnet (not shown) secures the body 104 to the fitting tube 102. In an illustrated embodiment, the tolerance indicator 203 extends from the second curved lower portion 602 and further comprises an indicator that aligns 603 with the fitting tube 102 at the cable centerline (not shown).

Figure 8:
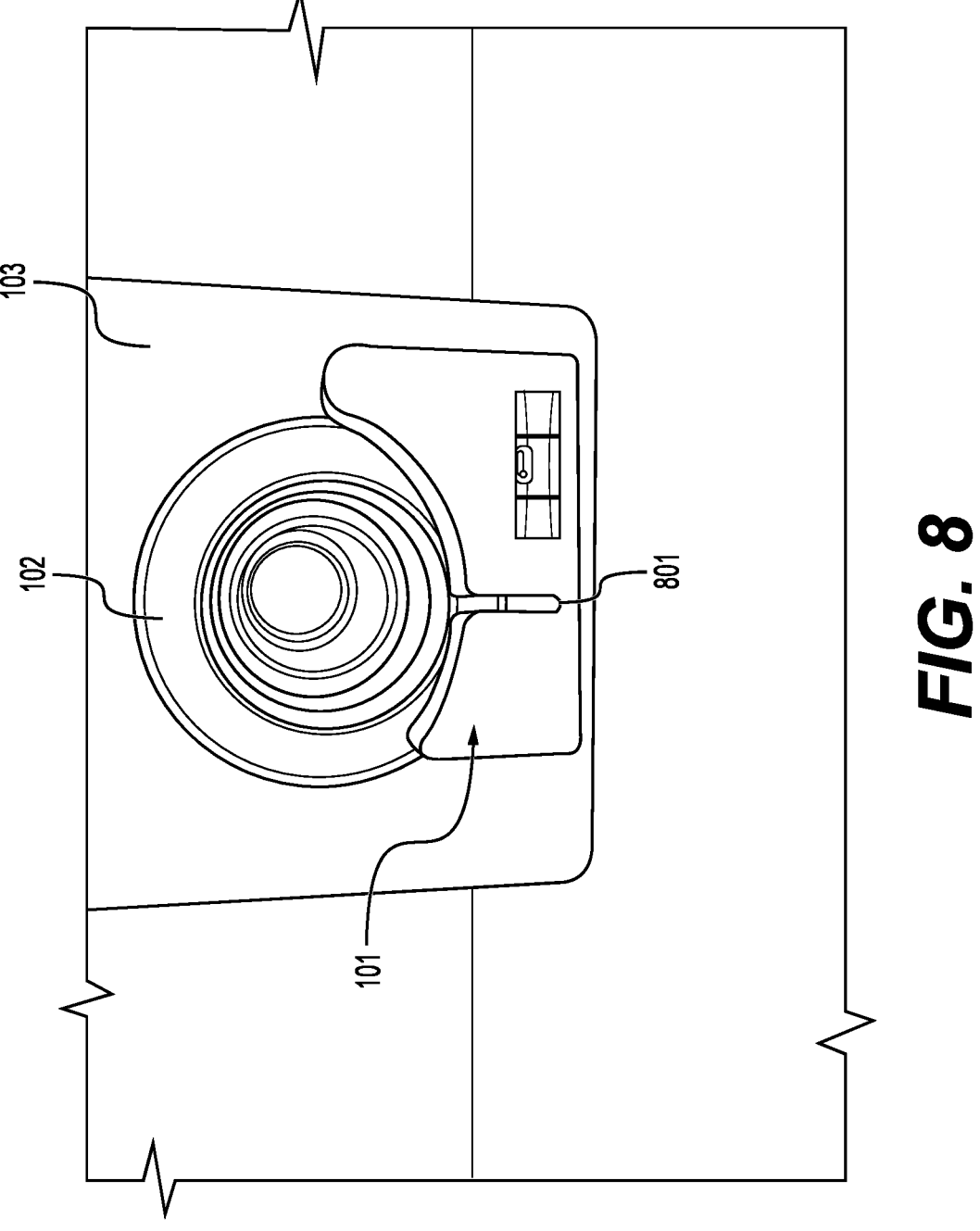
FIG. 8 shows a front view of the trunk cable installation verification tool attached to a fitting tube on a rotunda wall.

FIG. 8 shows a front view of the trunk cable installation verification tool 101 attached to a fitting tube 102 on a rotunda wall 103. The fitting tube centreline 204 (as best illustrated in FIG. 4B) is located at the 6:00 position. In an illustrated embodiment, the tolerance indicator comprises a tolerance window 801 for verifying and validating the fitting tube centerline.

In an alternate embodiment, a different attachment mechanism might be required if an embodiment of the inventive tool were used with polymer or nonmagnetic materials.

Although the invention has been described in detail with reference to certain preferred embodiments, variations and modifications exist within the spirit and scope of the invention as described and defined in the following claims.

The invention claimed is:

1. A trunk cable installation verification tool comprising:
a body that attaches to a threaded fitting tube;
a level tube;
a magnet; and
a tolerance indicator for aligning a cable;
wherein said body comprises a first curved upper portion that fits the contours of said fitting tube and a second curved lower portion that fits contours of said fitting tube threads;
wherein said magnet secures said body to said fitting tube;
wherein said tolerance indicator extends from said second curved lower portion and further comprises an indicator that aligns with said fitting tube at a centerline.

2. The trunk cable installation verification tool of claim 1, wherein said said fitting tube centerline comprises an identification line at 6:00 position.

3. The trunk cable installation verification tool of claim 2, wherein said said tolerance indicator comprises a V-shaped protrusion for verifying and validating said fitting tube centerline.

4. The trunk cable installation verification tool of claim 2, wherein said said tolerance indicator comprises a tolerance window for verifying and validating said fitting tube centerline.

5. The trunk cable installation verification tool of claim 1, wherein said said fitting tube centerline comprises an identification line at 6:00 position.

6. The trunk cable installation verification tool of claim 5, wherein said said tolerance indicator comprises a V-shaped protrusion for verifying and validating said fitting tube centerline.

7. A trunk cable installation verification tool comprising:
a body that attaches to a fitting tube;
a level tube;
a magnet; and
a tolerance indicator for aligning a cable;
wherein said magnet secures said body to said fitting tube;
wherein said tolerance indicator extends from said body and further comprises an indicator that aligns with said fitting tube at a centerline;
wherein said tolerance indicator comprises a tolerance window for verifying and validating said fitting tube centerline.

8. A trunk cable installation verification system comprising:
a trunk cable installation verification tool;
a fitting tube comprising a centerline; and
a cable comprising a cable centerline;
wherein said trunk cable installation verification tool comprises a body that attaches to said fitting tube, a level tube, a magnet, and a tolerance indicator;
wherein said magnet secures said body to said fitting tube, and said tolerance indicator aligns with said fitting tube centerline;
wherein said cable is properly installed when said cable centerline is aligned with said fitting tube centreline as verified by said tolerance indicator.

9. The trunk cable installation verification tool of claim 8, wherein said said tolerance indicator comprises a V-shaped protrusion for verifying and validating said fitting tube centerline.

10. The trunk cable installation verification tool of claim 8, wherein said said tolerance indicator comprises a tolerance window for verifying and validating said fitting tube centerline.

\* \* \* \* \*